(12) United States Patent
Wang

(10) Patent No.: US 7,474,473 B1
(45) Date of Patent: Jan. 6, 2009

(54) PROTECTING STRUCTURE FOR MOVABLE MECHANISM IN A MINIATURE LENS

(75) Inventor: Hung-Lin Wang, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 58 days.

(21) Appl. No.: 11/822,164

(22) Filed: Jul. 3, 2007

(51) Int. Cl.
G02B 15/14 (2006.01)
G02B 7/02 (2006.01)
(52) U.S. Cl. ........................... 359/703; 359/819
(58) Field of Classification Search .............. 359/703
See application file for complete search history.

(56) References Cited

U.S. PATENT DOCUMENTS

2007/0159550 A1* 7/2007 Cheng .................... 348/335
2007/0247539 A1* 10/2007 Ho et al. .................. 348/335

* cited by examiner

Primary Examiner—Jordan M. Schwartz
Assistant Examiner—James C Jones
(74) Attorney, Agent, or Firm—Rosenberg, Klein & Lee

(57) ABSTRACT

A protecting structure for movable mechanism in a miniature lens is mounted in a housing of a focusing mechanism of the miniature lens and includes an upper cover defining a central opening and fixed in the housing; a lens holder for holding a lens therein; at least one elastic member connecting the lens holder to the upper cover, so that the lens holder is suspended in the housing and axially displaceable forward and rearward to achieve the purpose of focusing; and at least one protective member being received in the central opening of the upper cover to locate outside the elastic member relative to the lens holder for restricting the lens holder from moving laterally, and limiting a torsion force produced at the time of screwing the lens into the lens holder, so as to protect the elastic member against deformation due to the torsion force.

2 Claims, 5 Drawing Sheets

PROTECTING STRUCTURE FOR MOVABLE MECHANISM IN A MINIATURE LENS

FIELD OF THE INVENTION

The present invention relates to a protecting structure for movable mechanism in a miniature lens, and more particularly to a structure for protecting elastic members in a miniature lens focusing driving mechanism against deformation.

BACKGROUND OF THE INVENTION

With the advancement in scientific technologies and the modularization and miniaturization of camera lens, it is now possible to produce digital cameras having a very small volume, and most of currently available mobile phones are provided with the function of a digital camera. In a miniature lens, there are many different auto-focusing driving mechanisms. Among others, voice coil motor (VCM) is the currently most widely adopted auto-focusing driving mechanism. The VCM has the advantages of small volume, low power consumption, accurately actuated displacement, and cost-effective, and is therefore very suitable for short-distance driving in miniature lens auto-focusing.

FIG. 1 is an exploded perspective view showing that a conventional movable lens focusing mechanism includes an upper cover 10, a lower cover 11, a lens holder 12, and a an outer frame 13 being provided at four inner wall surfaces with a magnet 14 each. The lens holder 12 is internally provided with screw threads 15 for a lens 16 to screw thereinto. A winding 17 is wound around the lens holder 12. The lens holder 12 is supported by an upper plate spring 18 and a lower plate spring 19 to be axially movably located at a center in the outer frame 13 and surrounded by the four magnets 14. When the winding 17 is supplied with an amount of electric current to thereby produce a magnetic field polarity, the lens holder 12 and the four magnets 14 mutually repulse or attract, bringing the lens holder 12 and accordingly, the lens 16 to displace for focusing.

When the lens 16 is being screwed into the lens holder 12, a torsion force is produced and applied to the lens holder 12. Since the upper and the lower plate spring 18, 19 connected to and supporting the lens holder 12 have a relatively small thickness, which is generally as small as 0.06 cm, and include relatively thin elastic bendable portions, as shown in FIG. 2, the two plate springs 18, 19 tend to deform or even break due to the torsion force produced at the time the lens 16 is screwed into the lens holder 12.

To enable a movable lens focusing mechanism with low power consumption and quick displacement, the elastic members for supporting the lens holder 12 have been designed to be elastically movable in an axial direction without any elastic protection in lateral directions. Under this condition, a lens just could not afford to fall because a big impact due to falling would cause the lens to displace laterally and result in damage of the elastic members. That is, the lens would become damaged or useless due to lack of elastic protection in the lateral directions.

It is therefore tried by the inventor to develop a structure for protecting the elastic members in the miniature lens against deformation.

SUMMARY OF THE INVENTION

A primary object of the present invention is to provide a protecting structure for movable mechanism in a miniature lens, so that elastic members in a movable miniature lens focusing mechanism are protected against deformation.

To achieve the above and other objects, the protecting structure for movable mechanism in a miniature lens according to the present invention is mounted in a housing of a miniature lens focusing mechanism, and includes an upper cover, a lens holder, at least one elastic member, and at least one protective member. The lens holder is configured to hold a lens therein. The at least one elastic member connects the lens holder to the upper cover, so that the lens holder is supported by the elastic member to suspend in the housing and is axially displaceable forward or rearward for focusing. The protective member is located outside the elastic member relative to the lens holder and received in a central opening of the upper cover for restricting the lens holder from displacing laterally, and limiting the torsion force produced at the time of screwing the lens into the lens holder, so as to protect the elastic member against deformation.

In the present invention, the upper cover is provided with at least one notch, and the protective member is provided with at least one tongue corresponding to the notch on the upper cover. The protective member is received in the central opening of the upper cover with the at least one tongue engaged with the at least one notch, so as to limit an extent within which the elastic member can be turned or horizontally moved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
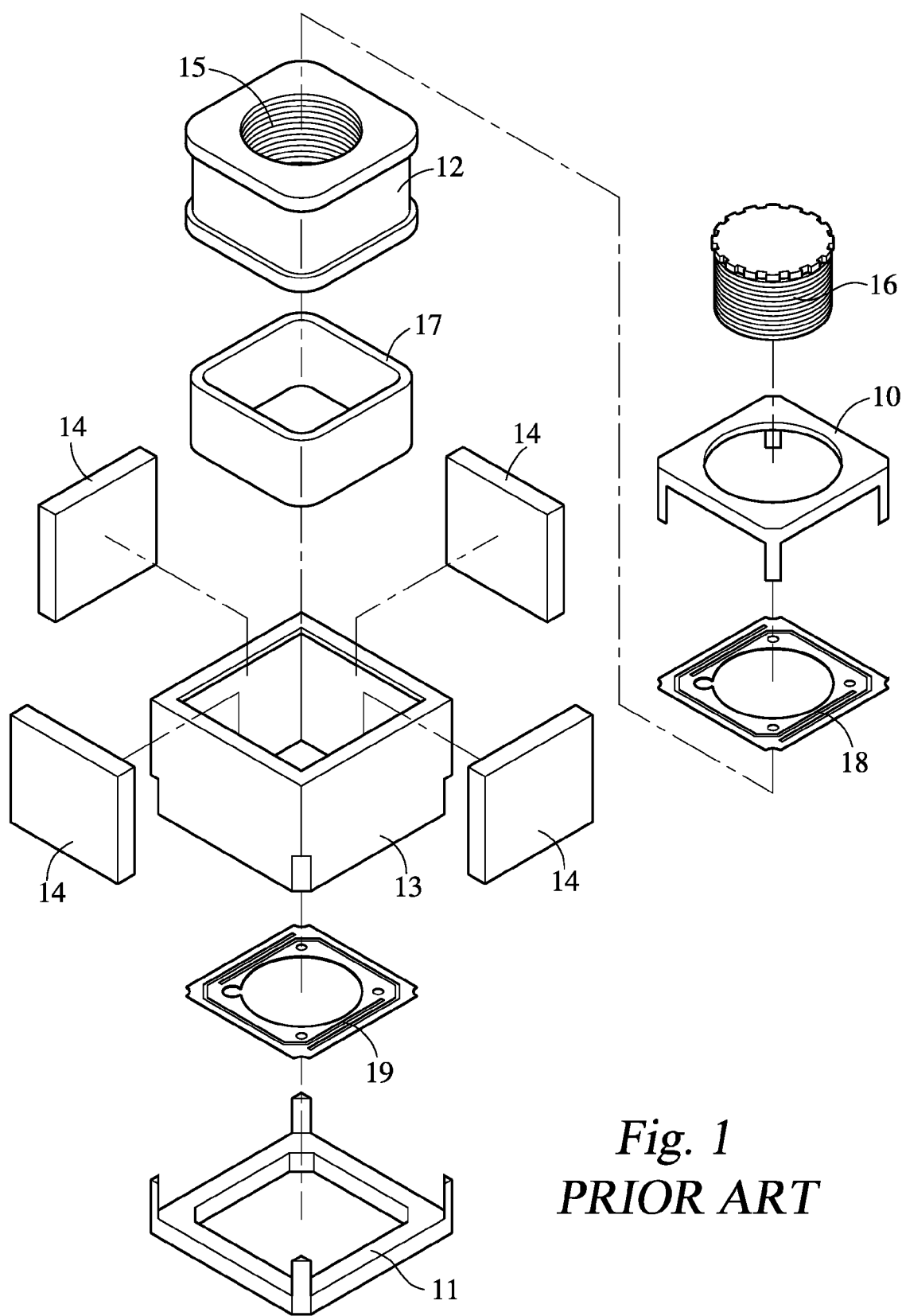
FIG. 1 is an exploded perspective view of a conventional movable lens focusing mechanism.
Figure 2:
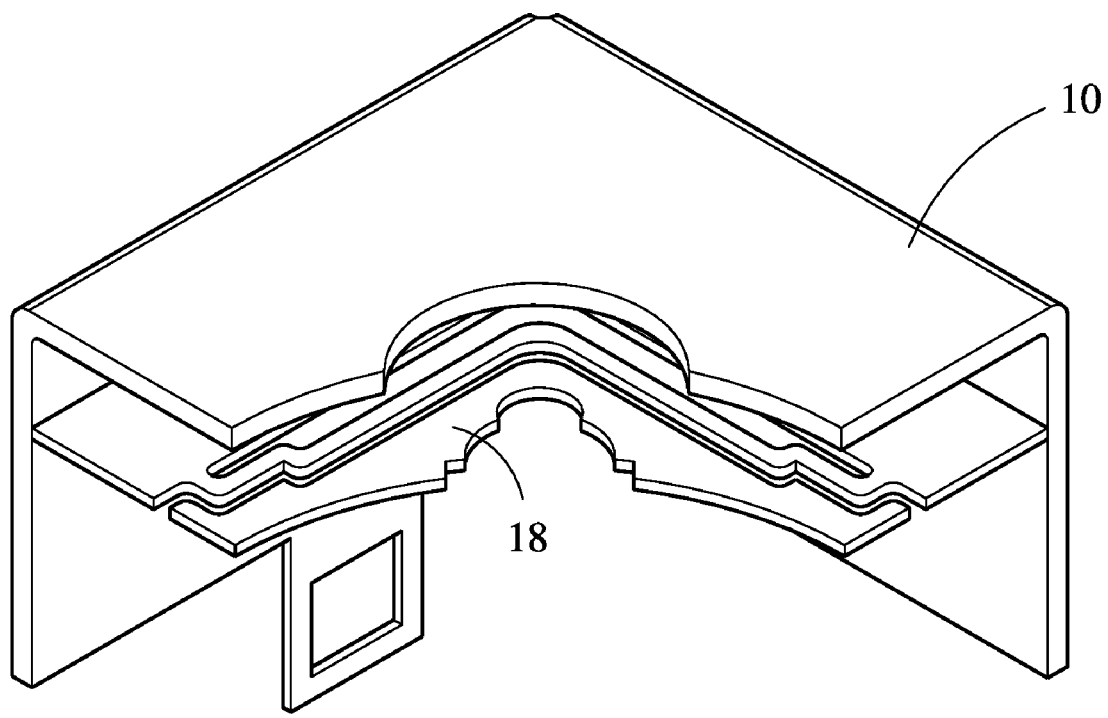
FIG. 2 is a fragmentary cutaway view of the lens focusing mechanism of FIG. 1 in an assembled state.
Figure 3:
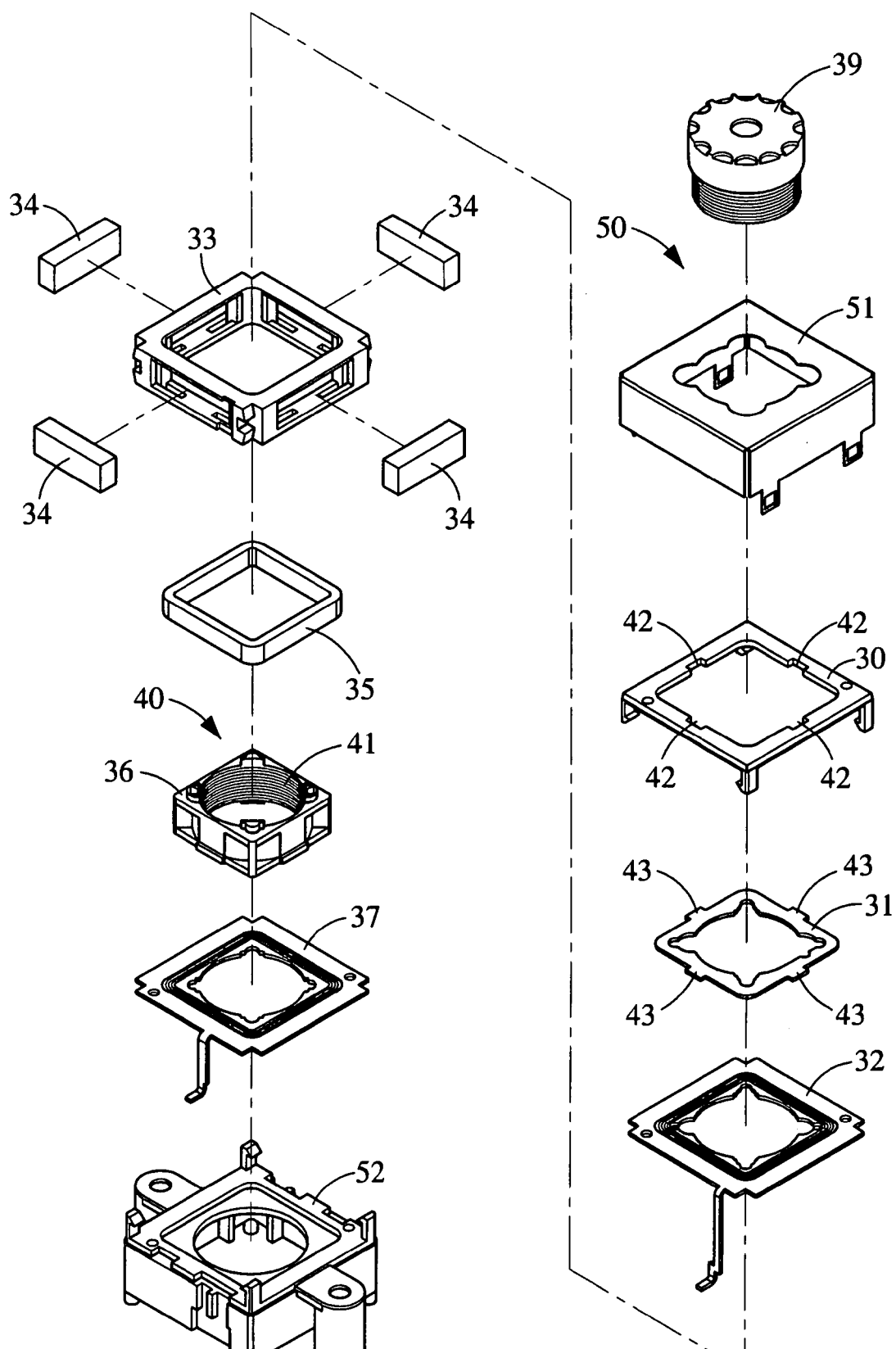
FIG. 3 is an exploded perspective view of a protecting structure for movable mechanism in a miniature lens according to the present invention.

Please refer to FIG. 3 that is an exploded perspective view of a protecting structure for movable mechanism in a miniature lens according to the present invention mounted in a housing 50 of a focusing mechanism of the miniature lens. The housing 50 consists of an upper case 51 and a base 52, and the present invention is received in the upper case 51. As shown, the protecting structure of the present invention includes an upper cover 30, a protective member 31, a first elastic member 32, a frame 33, a plurality of magnetic elements 34, a winding 35, a lens holder 36, and a second elastic member 37. The lens holder 36 is a hollow ring member defining a through hole 40, on a peripheral wall thereof screw threads 41 are provided, so that a lens 39 may be correspondingly screwed into the lens holder 36.

Figure 4:
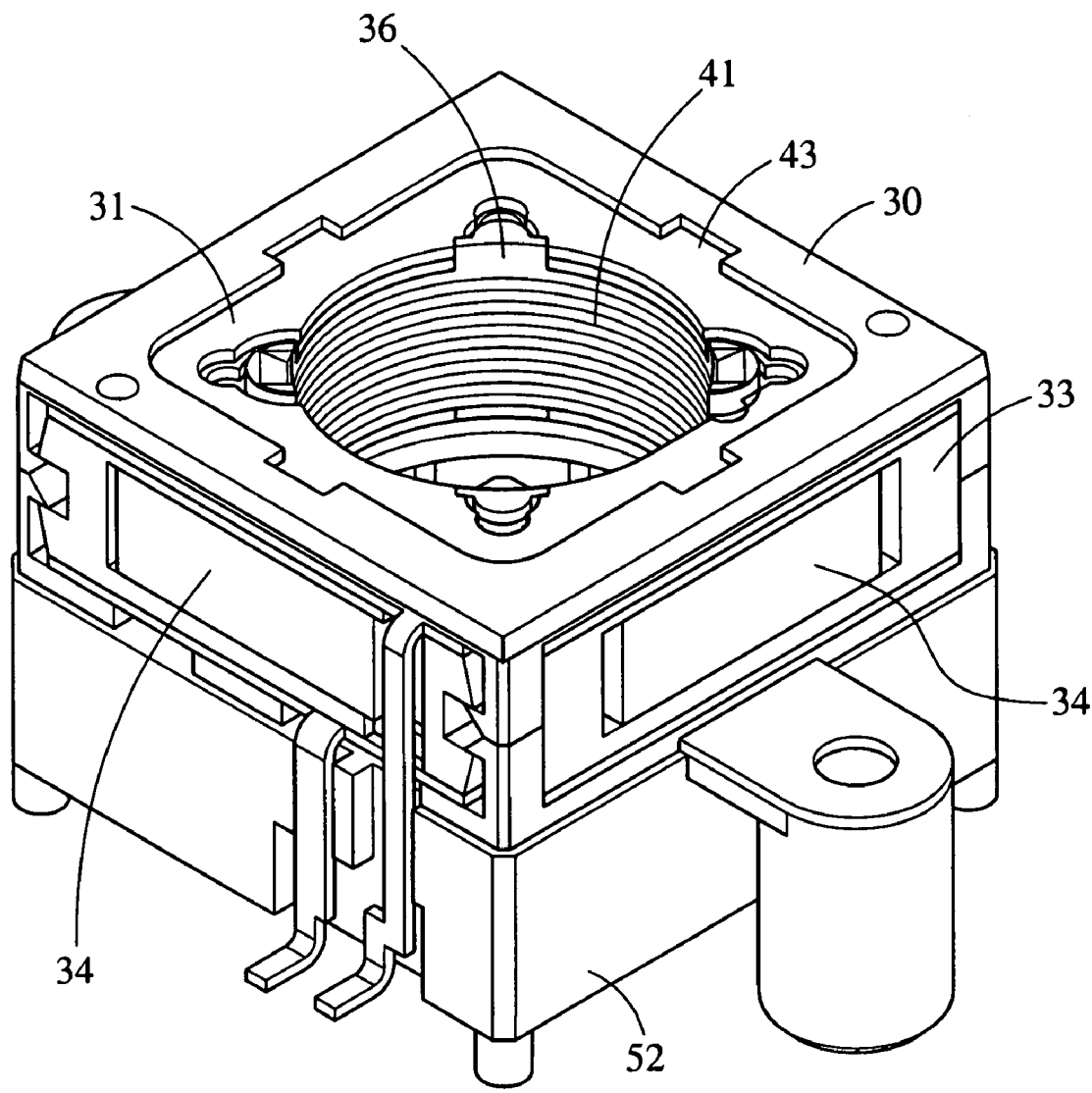
FIG. 4 is an assembled perspective view of the present invention with a lens and an upper case omitted therefrom.

FIG. 4 is an assembled perspective view of FIG. 3 with the lens 39 and the upper case 51 omitted therefrom. As shown, the upper cover 30 defines a central opening, along a peripheral edge of which at least one notch 42 is provided. The first elastic member 32 and the second elastic member 37 also have a central opening each, and are used to support the lens holder 36 in a suspended state. More specifically, the lens holder 36 is connected to the upper case 30 via the first elastic member 32, and to the base 52 via the second elastic member 37.

The winding 35 is wound around the lens holder 36. The frame 33 is located around the winding 35. The magnetic elements 34 are permanent magnets fixed to a wall of the frame 33. When an amount of electric current is supplied to the winding 35 to produce a magnetic field polarity, the lens holder 36 and the magnetic elements 34 mutually repulse or attract, bringing the lens holder 36 and accordingly, the lens 39 to axially displace forward or rearward for focusing. With the first and the second elastic member 32, 37, the lens holder 36 supported thereon is allowed to elastically return to an original position in the frame 33. The base 52 is a hollow structure having an inner contour corresponding to an outer contour of the lens holder 36, so that the lens holder 36 could be received in the base 52.

The protective member 31 has a central opening and is made of a rigid material, such as a metal sheet or a plastic sheet. The protective member 31 is located on or around the first elastic member 32, and received in the central opening of the upper cover 30 with a clearance as small as 0.12 cm left between the protective member 31 and the upper cover 30. The protective member 31 is provided along its peripheral edge with at least one tongue 43 corresponding to the at least one notch 42 on the upper cover 30. The protective member 31 is fixed to the upper cover 30 through engagement of the at least one tongue 43 with the at least one notch 42, so as to limit the elastic members 32, 37 to turn or laterally displace only within the range of 0.12 cm.

Figure 5:
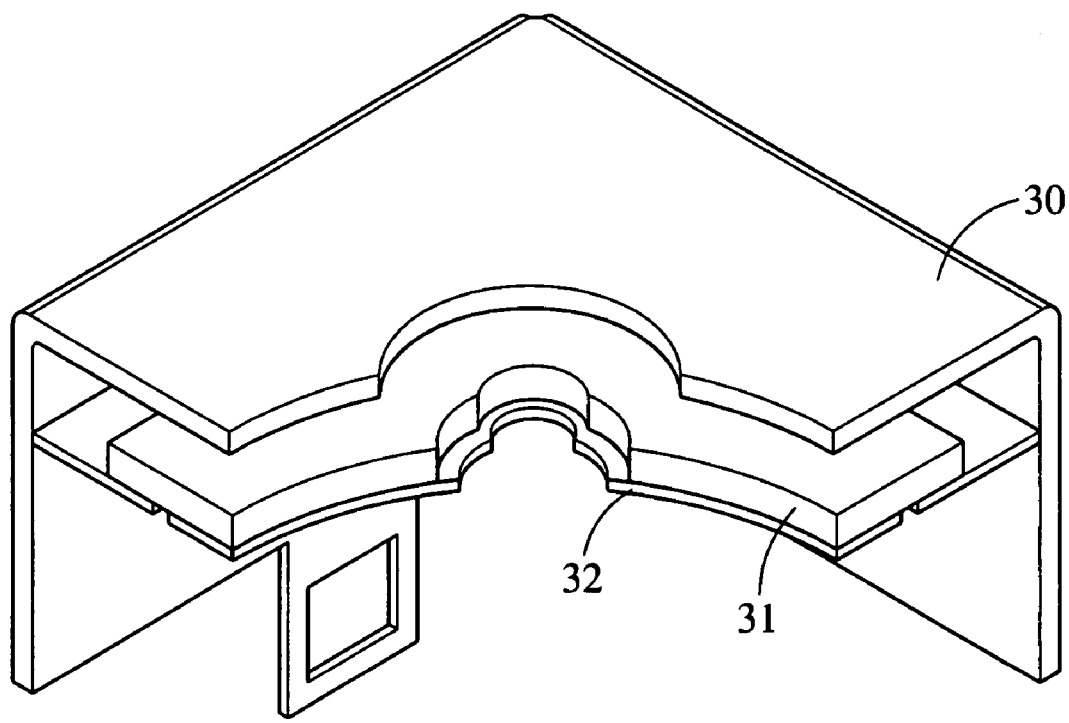
FIG. 5 is a cutaway view showing the position of a protective member relative to an upper cover and an elastic member included in the present invention.

FIG. 5 is a cutaway view showing the position of the protective member 31 relative to the upper cover 30 and the first elastic member 32. To mount the lens 39 in the lens holder 36, the lens 39 must be turned to screw into the through hole 40 defined in the lens holder 36. At this point, a torsion force is produced and applied to the upper and the lower elastic members 32, 37 with which the lens holder 36 is supported. However, since the protective member 31 is associated with the upper cover 30 through engagement of the at least one tongue 43 with the at least one notch 42, an extent by which the protective member 31 can be turned is limited. Moreover, since the protective member 31 has only limited range of turning, it further limits the torsion force of the elastic member 32, protecting the elastic member 32 against deformation due to the torsion force produced at the time of screwing the lens 39 into the lens holder 36.

With the above arrangements, the protective member 31 can only axially move forward and rearward while its lateral movement is limited due to the engaged tongues 43 and notches 42. Moreover, the protective member 31 may have a thickness up to 0.25 cm, and this thickness is high enough for the protective member 31 to absorb an impact caused by a fallen camera. Therefore, the protective member 31 functions to limit the lateral displacement and accordingly, the deformation of the first elastic member 32 possibly caused by a big impact from a fallen camera, and further protect the lens 39 against adverse influences by the impact.

In brief, in the protecting structure for movable mechanism in a miniature lens according to the present invention, the protective member 31 is provided on or around the first elastic member 32 to limit both the torsion force and the lateral movement of the lens 39, so that the first elastic member 32 is effectively protected against deformation.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A protecting structure for movable mechanism in a miniature lens, the protecting structure being mounted in a housing of a focusing mechanism of the miniature lens and comprising:

an upper cover defining a central opening and fixed in the housing of the miniature lens focusing mechanism;

a lens holder for holding a lens therein;

at least one elastic member connecting the lens holder to the upper cover, such that the lens holder is supported by the at least one elastic member to suspend in the housing to be axially displaceable forward and rearward for the purpose of focusing; and at least one protective member being received in the central opening of the upper cover to locate outside the elastic member relative to the lens holder for restricting the lens holder from moving laterally, and limiting a torsion force produced at the time of screwing a lens into the lens holder, so as to protect the elastic member against deformation due to the torsion force, wherein the upper cover is provided along the central opening with at least one notch, and the protective member is provided along an outer peripheral edge with at least one tongue corresponding to the at least one notch on the upper cover, so that the protective member is fixedly received in the central opening of the upper cover through engagement of the at least one tongue with the at least one notch to limit an extent within which the elastic member can be turned or laterally moved.

2. The structure for protecting movable mechanism in a miniature lens as claimed in claim 1, further comprising a winding and a frame in the housing; the winding being wound around the lens holder, and the frame being mounted around the winding and having a plurality of magnetic elements fixed to a peripheral wall of the frame; whereby when an amount of electric current is supplied to the winding to produce a magnetic field, the lens holder and the lens screwed thereto are caused to axially displace forward and rearward in the frame to achieve the purpose of focusing.

* * * * *